United States Patent
Cunningham et al.

(10) Patent No.: US 9,435,317 B2
(45) Date of Patent: Sep. 6, 2016

(54) SYSTEM AND METHOD FOR RENEWABLE ELECTRICAL POWER PRODUCTION USING WAVE ENERGY

(75) Inventors: Brian T. Cunningham, Potomac, MD (US); Daniel C. Morley, Bethany Beach, DE (US)

(73) Assignee: Wave Energy Conversion Corporation of America, Potomac, MD (US)

( * ) Notice: Subject to any disclaimer, the term of this patent is extended or adjusted under 35 U.S.C. 154(b) by 371 days.

(21) Appl. No.: 13/635,362

(22) PCT Filed: Jun. 23, 2011

(86) PCT No.: PCT/US2011/001121
§ 371 (c)(1),
(2), (4) Date: Sep. 14, 2012

(87) PCT Pub. No.: WO2011/162817
PCT Pub. Date: Dec. 29, 2011

(65) Prior Publication Data
US 2013/0008164 A1    Jan. 10, 2013

Related U.S. Application Data

(60) Provisional application No. 61/398,203, filed on Jun. 23, 2010.

(51) Int. Cl.
*F03B 13/14* (2006.01)
*F03B 13/20* (2006.01)

(52) U.S. Cl.
CPC ............ *F03B 13/20* (2013.01); *F05B 2240/97* (2013.01); *Y02E 10/38* (2013.01); *Y02E 10/46* (2013.01)

(58) Field of Classification Search
CPC .......... F03B 13/20; F03B 7/00; F03B 13/18; F03B 13/24
USPC ........................ 60/641.8, 505, 500, 502, 506
See application file for complete search history.

(56) References Cited

U.S. PATENT DOCUMENTS 562,317 A    6/1896 Martin
632,139 A    8/1899 Norton
(Continued)

FOREIGN PATENT DOCUMENTS

EP    1 036 273 A1    9/2003
JP    55 125364 A    9/1980
WO    WO 2011121167 A1 *    10/2011    .................... 60/506

OTHER PUBLICATIONS

M. E. McCormick et al., "Large-Scale Experimental Study of a Hinged-Barge Wave Energy Conversion System", Proceedings of an International Conference held in PATRAS, Greece, vol. 2, pp. 215-222, Sep. 30-Oct. 2, 1998.
(Continued)

*Primary Examiner* — Thomas Denion
*Assistant Examiner* — Shafiq Mian
(74) *Attorney, Agent, or Firm* — Juan Carlos A. Marquez; Marquez IP Law Office

(57) ABSTRACT

Wave energy conversion to produce electricity uses wave-engaging articulated, forward and after barges connected to a center inertial barge. A damper plate attached to the central barge minimizes heaving to increase stability. The barges use composite materials, steel or other materials that can withstand the impact and wear caused by a corrosive weather environment. A movable ballast weight in each barge adjusts the mass moment of inertia, and changes the natural pitching frequency. Electrical energy is generated from the motions of the barges and the movement of the movable ballast weights being converted by linear induction motor/generators and/or Pelton Wheel hydraulic systems connected to electrical generators. A dynamic computer control system controls the energy generating system to keep the forward/after barges and the movable ballast moving in phase with the wave excitation force. During dangerous wave action, the system is submerged and then re-surfaced when the waves have subsided.

19 Claims, 13 Drawing Sheets

(56) References Cited

U.S. PATENT DOCUMENTS

| | | | |
|---|---|---|---|
| 694,242 A | 2/1902 | Borchert | |
| 738,996 A | 9/1903 | Hagen | |
| 855,258 A | 5/1907 | Neal | |
| 882,883 A | 3/1908 | Hillson | |
| 886,883 A | 5/1908 | Smith | |
| 917,411 A | 4/1909 | Casella et al. | |
| 986,629 A | 3/1911 | Gilbert | |
| 1,072,272 A | 9/1913 | Thomas | |
| 1,078,323 A * | 11/1913 | Trull | F03B 13/20 417/332 |
| 1,169,356 A | 1/1916 | Sanderson | |
| 1,202,742 A | 10/1916 | Lane | |
| 1,408,094 A | 2/1922 | Kersey | |
| 1,471,222 A | 10/1923 | Taylor | |
| 1,528,165 A | 3/1925 | Pasquariello | |
| 1,567,470 A | 12/1925 | Settle | |
| 1,647,025 A | 10/1927 | Stich | |
| 1,688,032 A | 10/1928 | Blair | |
| 1,746,613 A | 2/1930 | Shuler | |
| 1,757,166 A | 5/1930 | Brady | |
| 1,818,066 A | 8/1931 | Jouy | |
| 1,867,780 A | 7/1932 | Tidwell | |
| 1,925,742 A | 9/1933 | Bamber et al. | |
| 1,953,285 A | 4/1934 | Arner | |
| 1,962,047 A | 6/1934 | Young | |
| 3,487,228 A | 12/1969 | Kriegel | |
| 3,515,889 A * | 6/1970 | Kammerer | 290/53 |
| 3,758,788 A | 9/1973 | Richeson | |
| 3,879,950 A | 4/1975 | Yamada | |
| 3,928,967 A | 12/1975 | Salter | |
| 4,013,382 A | 3/1977 | Diggs | |
| 4,048,801 A | 9/1977 | Tornabene | |
| 4,073,142 A | 2/1978 | Tornabene | |
| 4,098,084 A | 7/1978 | Cockerell | |
| 4,118,932 A | 10/1978 | Sivill | |
| 4,152,895 A | 5/1979 | Wirt | |
| 4,208,875 A | 6/1980 | Tsubota | |
| 4,210,821 A * | 7/1980 | Cockerell | F03B 13/20 290/53 |
| 4,241,579 A | 12/1980 | Borgren | |
| 4,355,511 A * | 10/1982 | Jones | 60/507 |
| RE31,111 E | 12/1982 | Hagen | |
| 4,392,349 A * | 7/1983 | Hagen | F03B 13/20 60/500 |
| 4,408,454 A | 10/1983 | Hagen et al. | |
| 4,718,231 A * | 1/1988 | Vides | F03B 13/1815 60/398 |
| 4,781,023 A | 11/1988 | Gordon | |
| 5,006,044 A * | 4/1991 | Walker et al. | 417/12 |
| 5,132,550 A * | 7/1992 | McCabe | 290/53 |
| 7,564,144 B1 * | 7/2009 | Srybnik et al. | 290/54 |
| 8,387,387 B1 * | 3/2013 | Henderson | F03G 6/003 60/641.8 |
| 8,484,964 B2 * | 7/2013 | Preftitsis | F03B 13/20 60/495 |
| 8,650,869 B1 * | 2/2014 | Mccormick | F16D 31/02 60/398 |
| 8,671,675 B2 * | 3/2014 | Cuong | F03B 13/20 290/42 |
| 2006/0112871 A1 * | 6/2006 | Dyhrberg | B63B 22/02 114/293 |
| 2006/0273593 A1 * | 12/2006 | Yemm | 290/42 |
| 2008/0038067 A1 * | 2/2008 | Sharapov | 405/224 |
| 2009/0217852 A1 * | 9/2009 | Zaman | 114/44 |
| 2009/0322092 A1 * | 12/2009 | Werjefelt | F03B 13/20 290/53 |
| 2010/0038913 A1 * | 2/2010 | Svelund | F03B 13/1815 290/53 |
| 2010/0102562 A1 * | 4/2010 | Greenspan | F03B 13/1865 290/53 |
| 2010/0148504 A1 * | 6/2010 | Gerber | 290/42 |
| 2010/0320759 A1 * | 12/2010 | Lightfoot | F03B 13/20 290/42 |
| 2013/0047601 A1 * | 2/2013 | Vuorinen | F03B 13/182 60/506 |

OTHER PUBLICATIONS

D. R. B. Kraemer et al., "Comparison of Experimental and Theoretical Results of the Motions of a McCabe Wave Pump", Department of Civil Engineering, EU Conf., pp. 8, 2000.

Clifford O. G. OHL, "McCabe Wave Pump Study", US Naval Academy, Annapolis, MD., pp. 1-42 May 9, 1996.

David R. B. Kraemer, Ph.D., "Ocean Wave-Energy Converter System Severe Weather Survival Technique: Submergence", Wave Energy Conversion Corporation of Ireland, pp. 1-6, Dec. 2012.

Michael E. McCormick et al., "White Paper on an Articulated-Barge Wave-Energy Conversion System for Electricity Production", McCormick and Ertekin, pp. 1-8, 2009.

International Search Report issued from International Bureau, in corresponding international Application No. PCT/US2011/001121, mailed Nov. 8, 2011, pp. 1-3.

B. Teillant et al., "Optimal Damping Profile for a Heaving Buoy Wave Energy Converter," Department of Electronic Engineering, National University of Ireland, pp. 1-6, 2010.

M. E. McCormick et al., "Large-Scale Experimental study of the McCabe Wave Pump", U.S. Naval Academy, pp. 1-20, Jan. 1992.

Extended European Search Report in corresponding European patent application 11 798 512.7, mailed by European Patent Office on Jun. 19, 2015, 6 pp.

* cited by examiner

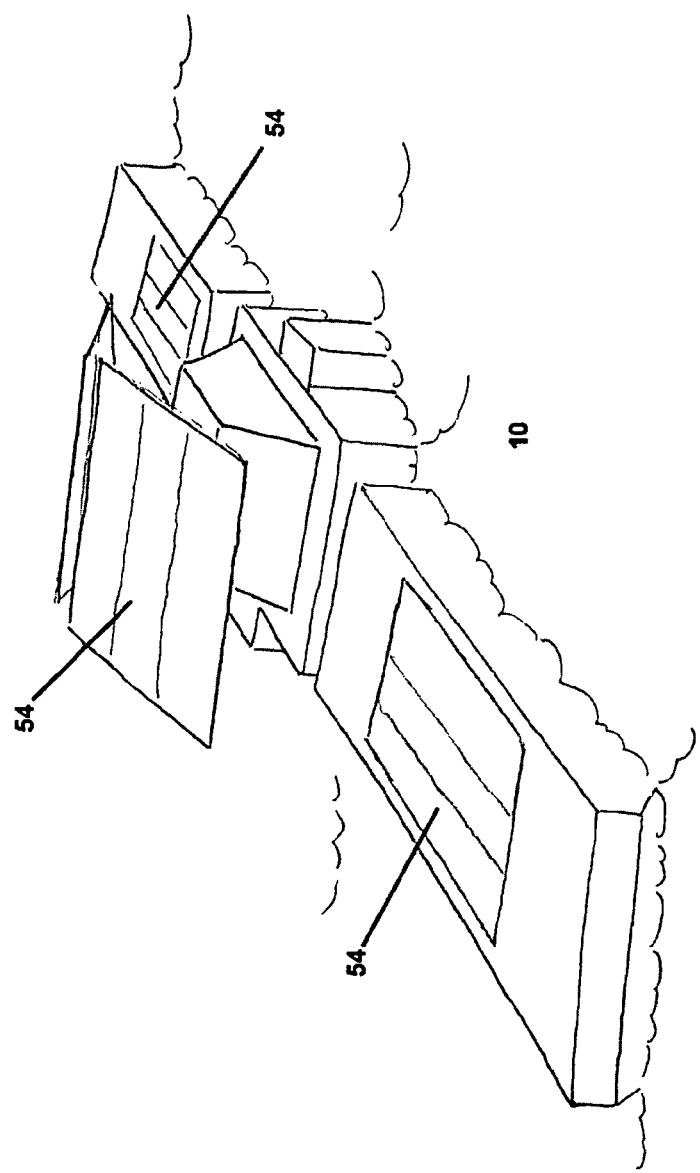

FIGURE 8
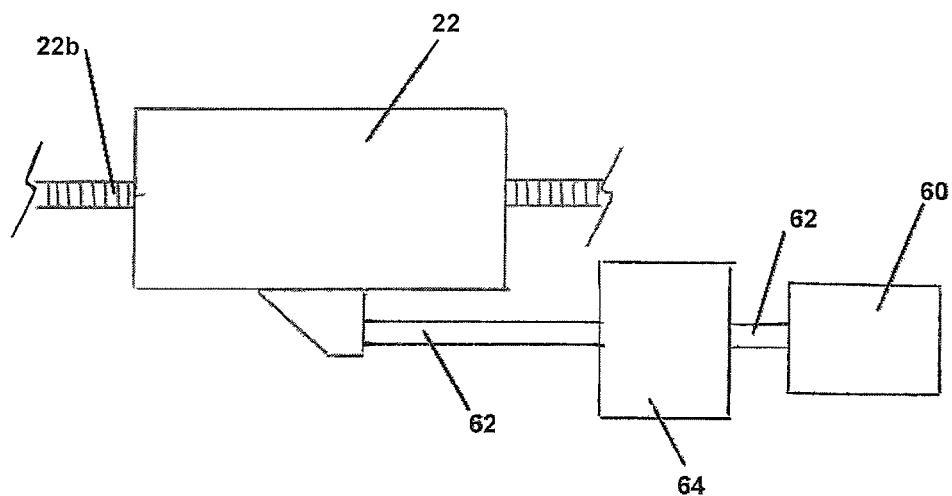
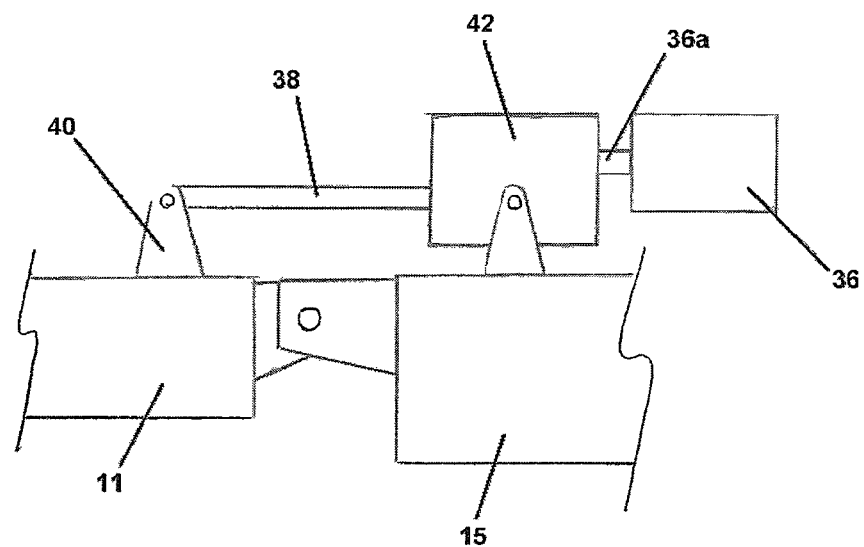
FIGURE 9

SYSTEM AND METHOD FOR RENEWABLE ELECTRICAL POWER PRODUCTION USING WAVE ENERGY

This application is a continuation-in-part of PCT Application No. US2011/001121 filed Jun. 23, 2011, which claims priority to U.S. Provisional Application No. 61/398,203 filed on Jun. 23, 2010, both of which this application claims priority thereto. Both prior applications are hereby incorporated by reference.

BACKGROUND OF THE INVENTION

1. Field of the Invention

The present invention relates to a system and method for converting into useful energy movements imparted thereto by the movement of water, preferably sea waves and/or sea currents.

The present invention also relates to a power generation system which extracts useful power from water waves. In particular, the invention relates to the interaction of various elements of the design of a wave driven generator unit. More specifically, the present invention absorbs wave energy, converts that energy into electrical energy, and transports that electrical energy from its offshore point of generation to a land-based power grid. Thus, the present invention produces large quantities of power economically for a public utility or large industrial user.

Further, the present invention also relates to a system utilizing wave engines and more particularly wave engines used to drive electric generators (i.e., Pelton Wheels) or linear inductance generators, wherein wave driven generators use a plurality of different sized floats to present a black body to the incoming wave energy whereby wave energy is nonlinearly coupled into hydraulic pumping means.

2. Background of the Prior Art

Various forms of apparatus are known having a movable member which is moved by sea waves relative to a fixed structure and whose movement is converted to usable energy. The fixed structure is usually mounted on the sea bed and this produces vast engineering problems and difficulties. It also means that such apparatus cannot be used in great depths of water. The known apparatus usually can only extract energy from one direction of water, i.e. either horizontal movement or vertical movement but not both. This greatly reduces the efficiency of the apparatus.

It has been well known for many years to harness wave energy by means of apparatus comprising two or more rafts or floats connected together so as to be pivotally movable relative to one another. Wave action causes the relative pivotal movement, and the relative movement is converted into useful energy.

Also, it has long been known in the art of power generation to use the potential energy available in ocean waves to lift a float. A variety of ingenious mechanical linkages have been developed in an attempt to efficiently capture the energy of ocean waves. See, for example, U.S. Pat. Nos. 562,317; 632,139; 694,242; 738,996; 886,883; 917,411 and 986,629. All of these early patents rely upon mechanical linkages between fixed floats to trap the rocking, lifting, falling or longitudinal motions of waves. All of the engines disclosed in these patents are mechanically complex and highly inefficient.

While all the above cited references depend on the potential energy of waves to develop motive power, some wave motors in the past taught the use of the wave's kinetic energy, such as U.S. Pat. No. 1,072,272. A careful study of the prior art shows that most historical wave motors utilize either (1) the kinetic energy of waves by devices such as paddle wheels, or (2) the wave's potential energy by a float or a series of floats. Few devices utilize both forms of energy. The prior art, insofar as it relates to wave engines that rely upon the lifting power of waves, i.e., its potential energy, rely either on a single float, for example U.S. Pat. Nos. 1,202,742; 1,471,222; 1,647,025; 1,746,613; 1,953,285 and 1,962,047, or utilize a series of floats of the same size, for example U.S. Pat. Nos. 1,925,742; 1,867,780; 1,688,032; 1,567,470, and 1,408,094. Additionally, many early wave motors are extremely complex mechanically. For example, see U.S. Pat. Nos. 1,528,165; 1,169,356 and 1,818,066.

Many prior art wave motors teach the direct linear coupling of the float's motion through either mechanical or hydraulic means to the motion of a shaft or piston. As a result, such wave motors had to be very rugged and heavy to withstand the wide spectrum of wave energy incident upon them. For example, one wave motor installed in Atlantic City, N.J. consisted of six foot cylinder floats 4 feet high. Each float weighed about 3,100 pounds and was lifted two feet by waves 11 times per minute. They drove a horizontal shaft by means of chains and rachets, developing about 11 horsepower, steadiness being obtained by the use of heavy flywheels. The inefficiency, capital cost and complexity of such prior art wave motors caused them to be unsuccessful. (Power, Jan. 17, 1911). (A similar wave motor was proposed by Smith in Mechanical Engineering, September 1927 at page 995.)

The most modern wave motors taught by the prior art do not differ significantly in the manner of operation from wave engines taught at the beginning of this century. See, for example, U.S. Pat. No. 3,879,950, issued Apr. 29, 1975 to Kiichi Yamada for a wave generator to be used in conjunction with an offshore nuclear power plant. This modern wave motor uses a plurality of identical floats whose motion is coupled linearly to a series of pneumatic pistons. Unfortunately, such a linearly coupled collector cannot efficiently trap wave energy.

Waves in the ocean vary in amplitude, or wave height, from a fraction of a foot to over 50 feet and in frequency from a wave length of less than 5 feet to over 1,000 feet. To extract the maximum potential energy from any given wave, a float must be capable of dynamically coupling to the wave's movement. A given size float will respond most efficiently to only one wave length. To be efficient, a wave motor must provide a plurality of different size floats capable of coupling efficiently into a broad spectrum of differing wavelengths, i.e., to all the waves from which power must be efficiently extracted. Broadly, this concept is called "resonance".

In addition to resonance with a broad spectrum of wavelengths, the floats of an efficient wave motor must be capable of extracting power from both low and high amplitude waves. Because waves differ in amplitude by as much as two orders of magnitude, any device that extracts power by linearly coupling wave movement to gears or pistons will have to be inefficient in extracting power from either the high or low amplitude end of the wave power spectrum.

Theoretically, a single float acting alone, even if it is the proper size, can only absorb a fraction of the available power from a wave incident upon it. This is caused by the fact that a portion of the wave's energy is absorbed by the float, another portion is reflected back from the float and another portion is transmitted through the float to its attached structures. This fact, as well as the fact that wave motors taught by the prior art do not couple efficiently into either the frequency or amplitude spectrum of ocean waves, have caused all prior art wave motors to be very inefficient.

Methods and apparatus designed to capture and convert wave energy into a variety of other forms of useful energy are described in a number of prior art publications and patents, as noted above. These early patents relied on mechanical linkages between fixed floats to trap the rocking, lifting, falling, or longitudinal motion of the waves but were highly inefficient due to their mechanical complexities. Some of the most mechanically complex devices are illustrated in U.S. Pat. Nos. 1,169,356, 1,471,222, 1,528,165, 1,818,066.

The U.K. Patent Application No. 2113311A discloses a particular arrangement of rafts or floats, namely two rafts connected to one another for relative pivotal movement about a common pivotal shaft, and a damping mechanism for damping the movement of the pivotal shaft so as to maintain the pivotal shaft substantially fixed relative to the mean level of the water. The relative motion of the rafts drives pumps, which drive seawater to an elevated storage tank from which the water may be released to generate electricity.

In prior art wave powered prime movers such as described in U.S. Pat. No. 4,098,084 (Cockerell), the pontoons or buoyant members, will in certain long wave conditions, i.e. when wave length is greater than four times the length of an individual pontoon, become wave followers and thus will not move relative to each other to any great extent. A study of the prior art shows that most inventions designed to convert wave energy into useful energy utilize either (1) the kinetic energy of the waves by devices such as paddle wheels, or (2) the wave's potential energy by a float or a series of floats. The vast majority of prior art inventions for converting wave energy into useful energy rely upon the potential energy of a wave, i.e., the lifting power of the wave. Many such inventions rely upon a single float for absorbing a wave's energy. See, for example, U.S. Pat. Nos. 562,317, 738,996, 1,202,742, 1,471,222, 1,647,025, 1,746,613, 1,953,285, 1,962,047, and 3,487,228. Other early inventions rely upon a series of floats for converting the wave's potential energy into other forms, examples of which include U.S. Pat. Nos. 632,139, 855,258, 882,883, 917,411, 1,408,094, 1,567,470, 1,688,032, 1,867,780, and 1,925,742.

U.S. Pat. No. Re31,111 relates to wave driven generators comprising a plurality of floats that are tuned to be responsive to incoming waves by the use of different sized floats whereby wave energy is extracted by the floats and converted into hydraulic energy. This hydraulic energy is then employed to drive a turbine generator and generate electricity. The floats are connected together by hinges as to form what is defined as a "Hagen-array". Each float is pivotally connected to a larger float in such a manner as to allow relative movement between the floats. Hydraulic pistons and cylinders are mounted between the floats. These hydraulic pistons and cylinders are responsive to the relative movement between the hinged floats, and generate hydraulic energy in response to such movement. This hydraulic energy is stored in an accumulator which is then converted into electrical energy by a turbine-generator, located onboard of one of the floats. The array is moored to the sea floor by cables in a manner such that it is free to rotate so the floats maintain a desired position, i.e. facing the incoming waves.

A conceptual presentation of a wave energy conversion system appears in *Transactions of the ASME*, page 492, Vol. 105, December 1984. The system depicted therein includes an array, composed of rafts or floats of various lengths hinged together, and hydraulic pistons and cylinders positioned between the floats for absorbing wave energy and converting it into electrical energy. An articulated raft system, or array, is shown moored to the sea floor by a single anchor leg mooring system. A schematic representation of an onboard power conversion system is illustrated with the components of the system including hydraulic pistons and cylinders, accumulators, turbines, and generators. A submarine cable is illustrated for transmitting the electrical energy that is generated.

The Hagen-array system of hinged rafts suffers from the fact that the unit length of the rafts perpendicular to the crests (parallel to the line of incidence) must be approximately one wave length of the incident waves. The result is good efficiency relative to the beam dimension of the rafts but poor efficiency in terms of energy extracted per raft size or weight. The poor efficiency results because the Hagen-array system does not make use of the physical parameters of the rafts other than unit length to tune the system properly so as to respond to the broad spectrum of wave frequencies that occur in the ocean.

A number of other patents disclose utilizing a plurality of floats to convert wave energy into useful energy. For example U.S. Pat. Nos. 4,392,349, 4,098,084, 3,879,950, and 1,408,094 disclose raft-like floats, hinged together, so as to form articulated chains or arrays. U.S. Pat. Nos. 4,241,579, 4,073,142, 4,048,801, 1,757,166 disclose energy conversion systems where a plurality of buoy-like floats are positioned in particular patterns so that wave energy resulting in upward and downward reciprocation of the floats is converted into useful energy. U.S. Pat. No. 3,758,788 discloses an energy conversion system where buoyant structures are connected together by pivotal structures and bellows which are activated by movement between the buoyant structures. The positive air or fluid pressure is then used to drive a turbine generator to generate electrical energy. A variety of hinges are disclosed for connecting rafts or floats together. For example, see U.S. Pat. Nos. 4,098,084, 3,879,950, 1,408,094, 917,411, 882,883, and 632,139. Additionally, U.S. Pat. No. 4,118,932 discloses hinging two floats together whereby the hinge also forms a pump which generates hydraulic energy in response to the relative rotational movement of the floats about the hingeline. Other prior art patents disclose a variety of pistons or bellows to convert wave energy into hydraulic energy, such as U.S. Pat. Nos. 4,408,454, 4,208,875, 4,013,382, 3,879,950, 1,757,166. Additionally, the device known as the Salter "nodding duck" which is disclosed in U.S. Pat. No. 3,928,967 utilizes a variable stroke rotary pump to convert the pivotal motion of its energy removing member into usable hydraulic energy.

U.S. Pat. No. 3,928,967 describes a system composed of a plurality of wave power absorbers deployed so as to intercept power from a line parallel to the incident wave crests that is long compared to the dimension perpendicular to the wave crests. The device described in this patent is an efficient absorber but suffers from the lack of stable reference necessary for power extraction. Although the device incorporates several features that improve the efficiency of energy capture, the concept fails to incorporate the more important features necessary for economical wave energy generation efficiency.

A number of other mooring or anchoring means are disclosed in the prior art. See, for example, U.S. Pat. Nos. 4,408,454; 4,013,382; 3,879,950; 1,746,613; 917,411 and 855,258. The supporting structure or mooring system required to operate many of these inventions, however, is quite elaborate and costly. See, for example, U.S. Pat. Nos. 1,757,166; 3,879,950; 3,928,967 and 4,013,382. A number of prior art patents disclose converting the captured wave energy into electrical energy. See for example, U.S. Pat. Nos. 4,152,895; 4,013,382; 3,879,950; 3,487,228; 1,962,047; 1,757,166 and 738,996.

U.S. Pat. No. 1,757,166 covers an apparatus and method of obtaining power from ocean waves. However, even this prior art teaches the use of a plurality of single unconnected floats of the same size. No prior art found by the inventor teaches the advantages of tying together a group of floats in an array to form a wave trap to capture reflected and transmitted wave energy. Also, no prior art found by the inventor teaches the nonlinear coupling of the floats to their associated power extraction devices.

The prior art is limited either to the mechanism by which power is transferred from wave to floating structure or to methods of converting the motion of a floating structure to useful power. The prior art does not make allowance for the random character of the incident waves by matching floating structure response to wave conditions that vary (1) annually for different locations around the world, (2) monthly (seasonal) fluctuations, and (3) over short intervals of time varying from fractions of an incident wave period to over several wave periods. Further, the prior art does not match the power train impedance to the incident wave characteristics so as to optimize power absorption and short time energy storage to achieve maximum power train efficiency.

The prior art does not analyze the economic factors that must be considered for an energy system to provide base load power to a shore installation. For example, the selection of deployment site includes factors such as bathymetry conditions for mooring and power transmission, distance from shore, matching onboard power generation to shore side power grid specifications, mooring depth, power collection from individual wave energy generating units, and power conditioning and transmission to shore.

SUMMARY OF THE INVENTION

A main object of the present invention is to provide a system and method that alleviates the above disadvantages of the individual components in the prior art to then achieve a system that is capable of extracting energy efficiently from a wide variety of wavelengths of ocean waves. In particular, an object of the present invention is to provide a system and method that utilizes an apparatus which is buoyant and can be moored by cable or the like using conventional or novel mooring techniques.

Another object of the invention is to provide a system and method that utilizes an apparatus which can extract energy from vertical and horizontal movement of water.

It is a further object of the present invention to provide a system and method that utilizes a wave engine that couples into the amplitude spectrum of ocean waves in a nonlinear manner so as to efficiently extract power from both high amplitude and low amplitude waves.

It is yet a further purpose of the present invention to provide a system and method that utilizes a wave generator whose multiple barges act together to form a black body trapping incident wave energy.

It is yet another purpose of the present invention to provide a system and method that utilizes a wave engine having an assemblage of different barges that function together as a wave trap to convert a large percentage of the wave energy incident upon it to hydraulic power.

Yet an even further object of the present invention is to provide a system and method that utilizes a wave motor that can easily be scaled up to provide a large amount of power cheaply and that is simple enough to require a low level of maintenance.

It is an even further object of the present invention to overcome the deficiencies of the prior art and provide a wave driven power generation system which efficiently converts wave energy into electrical energy and which is cost effective to construct and maintain. Other objects and advantages of the invention will appear from the following description.

The present invention is a system for converting wave energy into useful energy and comprises three barges: a wave-engaging forward barge and an after barge, each connected by hinges and hinge supports to a center inertial barge, allowing for articulated motion. Attached to central barge is a damper plate designed to minimize the heaving motion of the central barge and, thereby, minimize the vertical displacement and increasing stability of central barge. The concentrated weight of the plate supported by side spuds which movably connect to spudwells that are attached to the central barge will produce a pendular action, causing a pitching motion of the center barge which will, in turn, enhance the relative angular motions of the barge pairs. Resonance of the forward and after barges is achieved by a movable ballast weight that can be positioned at different locations between the bow and stern of each barge to adjust the mass moment of inertia of the system, thereby changing the natural pitching frequency. The pendular action of the barge pairs is translated into a hydraulic fluid flow in the power pumps and the motion control pumps. Specifically, the pendular action of the forward barge causes the power pumps to force hydraulic fluid to flow through corresponding high-pressure hydraulic feed lines into corresponding electrical generators and through low-pressure hydraulic feed lines back to the power pumps. Similarly, the pendular action of the after barge causes the motion control pumps to force hydraulic fluid to flow through their corresponding high-pressure hydraulic feed lines into corresponding electrical generators and through low-pressure hydraulic feed lines back to the motion control pumps. The power pumps and the motion control pumps are dual-acting hydraulic pumps whose outputs are rectified by a control system and smoothed by accumulators. The electrical generators are configured to generate electricity from the flow of hydraulic fluid through their internal turbines. As an alternative to a hydraulics-based electrical generation system, linear induction motor/generators, such as reciprocating linear alternators, would be connected between the fore and after barge, and the central barge such that the movement of the barges would be translated directly into the linear induction motor/generators to generate the electricity. The control system is configured to control the flow from the pumps to and through the turbines of the electrical generators or the operation of the linear induction motor/generators so as to be quasi-rectified-sinusoidal in time. The resistance properties inherent in a linear actuator/alternator array may be used to rectify the resonance.

In this regard, it is a further purpose of the invention to exploit the features and advantages offered by the use of rotating linear actuator technology as discussed further in detail hereinbelow, wherein power transfer efficiency can be maximized while, adding wave to wave braking action on the system to thereby improve by as much as 2× and 4× (depending on local wave climate conditions) the wave to wave resonance by "precisely holding AWECS' pose" in the wave cycle. This is done through the reverse operation of the rotating linear actuator, wherein power is applied to the rotating linear actuator.

The structural response of the barges can be adjusted so as to coincide with the frequency spectrum of the incident waves whereby maximum power output can be provided for the existing sea conditions of that area on a wave to wave basis.

In recognition of the fact that by design, the operation of the system is dependent upon an energetic wave climate, that same energetic wave climate that powers the system also can and does become ferocious enough to threaten the mechanical life of the system embodying the invention. Accordingly, the invention is contemplated to incorporate the necessary apparatus to, under either human or automatic sensing control, submerge to a depth such as 60 meters and hover at that's depth where calculations and experimental data have shown that surface turbulence is reduced to 37% of surface conditions. When the storm subsides, the system of the present invention, under manual or automatic control, surfaces to resume producing electricity.

The present invention has the following objectives and advantages:
1. The mooring structure is designed to resist the forces of the waves acting on the wave activated floating structures and to keep the system in place on the surface of the water, thus providing a stable reference platform for power removal.
2. The floating structures are designed to minimize reflected, transmitted, and self-generated waves thereby maximizing the power absorbed from ocean waves.
3. The floating structures employ the use of controlled mass, moment of inertia, and the geometrical shape of the hull to match the structure response to the spectrum of the incident waves, thereby maximizing power extraction efficiency.
4. The floating structures employ lightweight materials (i.e., composite materials) for all elements that are not needed for holding ballast, machinery, or for sustaining high operating loads, thereby reducing capital cost. This is especially noteworthy when using composite materials which can extend the product life of the system 1.5× to 2× that possible with a system made from conventional seaworthy materials (i.e., steel, aluminum, fiberglass) so as to contribute in reducing the costs of producing electricity thereby.
5. The power extraction device incorporates a control element that allows the power extraction impedance to be varied for maximum power extraction efficiency, thereby allowing maximum efficiency of power generation over short intervals of time.
7. Electrical onboard power generation capacity can be designed to provide optimum operating efficiency for a given average annual wave environment, thereby allowing maximum power conversion frequency for a given location.
8. Automatic sensing and control equipment are incorporated to isolate a part in the event of component failure or to allow modular shutdown for routine maintenance.
9. Those parts of the system that are subject to high wear and severe corrosion and loads can be replaced, thereby allowing maximum availability of power generating capacity and minimum operating and maintenance cost.
10. A unit can be disconnected from the mooring, control and power lines to allow transportation to shore for maintenance and repair. Further, a reserve unit can be installed to prevent loss of power capacity during drydocking or shore maintenance of wave energy units.

As a result of the unique features of the present invention, power systems may be installed by a user to meet variations in long term power demand through modular installation at great savings in invested capital. Still, the system, composed of a multiplicity of individual wave energy generating units, will produce power economically, competitive with conventional power sources.

As a result of this efficient absorption of wave energy the area directly behind the array may be relatively calm. The floating array taught by the present invention may thus function as a floating breakwater, although this is not a primary purpose of the invention.

According to the present invention there is provided apparatus for converting into useful energy movements imparted thereto by movement of water, comprising two or more interconnected members of which at least one is buoyant and which in use of the apparatus are movable relative to each other due to the motions of the water, at least one of said members being provided with or connected to means which in use of the apparatus is responsive to horizontal motions of the water, and means for converting the relative movements of said interconnected members and operation of the means responsive to horizontal motions of the water into useful energy.

The present invention provides a wave powered prime mover comprising an central barge and an inertial damping device located beneath the central barge at a depth many times greater than that of the barge; and at least one wave movable barge pivotally connected by a first hinge to the central barge, whereby in use the central body remains substantially stationary while each barge is moved by passing waves or swell over a wide range of wave lengths and each barge independently powers its own pump or pumps thus ensuring that variations in power can be accommodated to efficiently convert wave energy into electricity. The use of the central barge allows the wave powered prime mover to be energy productive over a wide range of wave conditions. In particular, relative movement between each barge and the central barge still occurs when wave length is greater than the length of the barge.

Conveniently, the damping device includes at least one damping plate which is movable relative to the inertial barge, whereby the damping plate may be tuned to the site conditions. Additionally, the damping device may be raised relative to the barge to enable the prime mover to be towed.

Preferably, each barge is provided with adjustable ballast to control the inertial properties of each pontoon whereby the prime mover may be tuned to the wave spectra at the site.

BRIEF DESCRIPTION OF THE DRAWINGS

The invention will now be described more particularly with reference to the accompanying drawings which show, by way of example only, one embodiment of wave powered prime mover according to the invention, wherein:

FIGS. 1A-1D illustrate various views of a first embodiment of the system of the present invention, wherein FIG. 1A shows a front elevation, FIG. 1B shows a side elevation, FIG. 1C shows a top elevation, and FIG. 1D shows a cutaway view of at least one embodiment of the interior structure and components of a barge hull;

FIGS. 7A and 7B show an overall perspective views of at least one embodiment of the system of the present invention illustrating combinations of enhancements or supplemental elements to the system depending on the specific application desired;

FIG. 8 illustrates one embodiment for an enhancement to the movable ballast enhancement system incorporated into the present invention; and FIG. 9 illustrates one embodiment for an alternative embodiment for electrical generation system incorporated into the present invention.

DETAILED DESCRIPTION OF THE PREFERRED EMBODIMENTS

First Preferred Embodiment

Figure 1A:
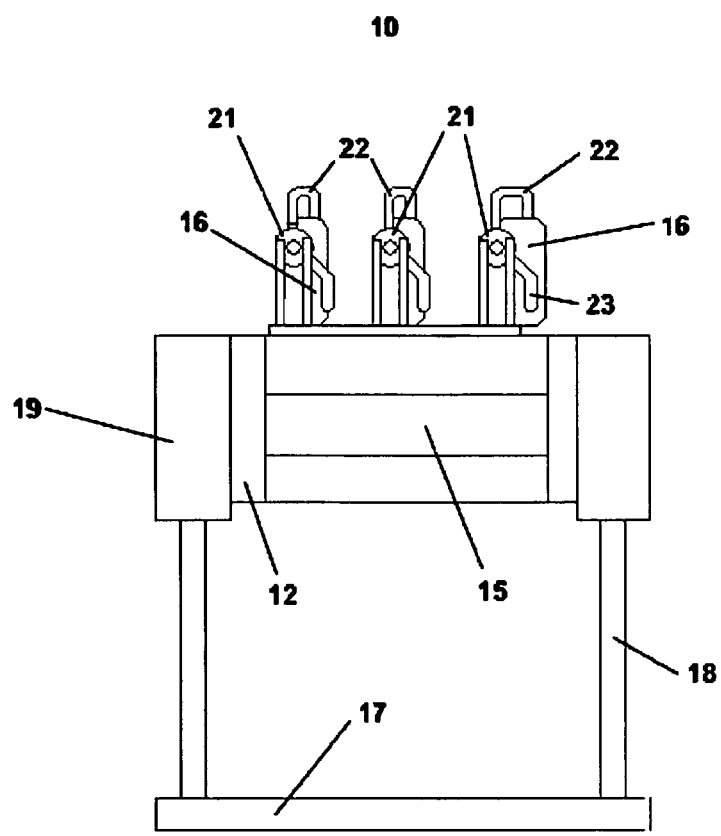
Figure 1B:
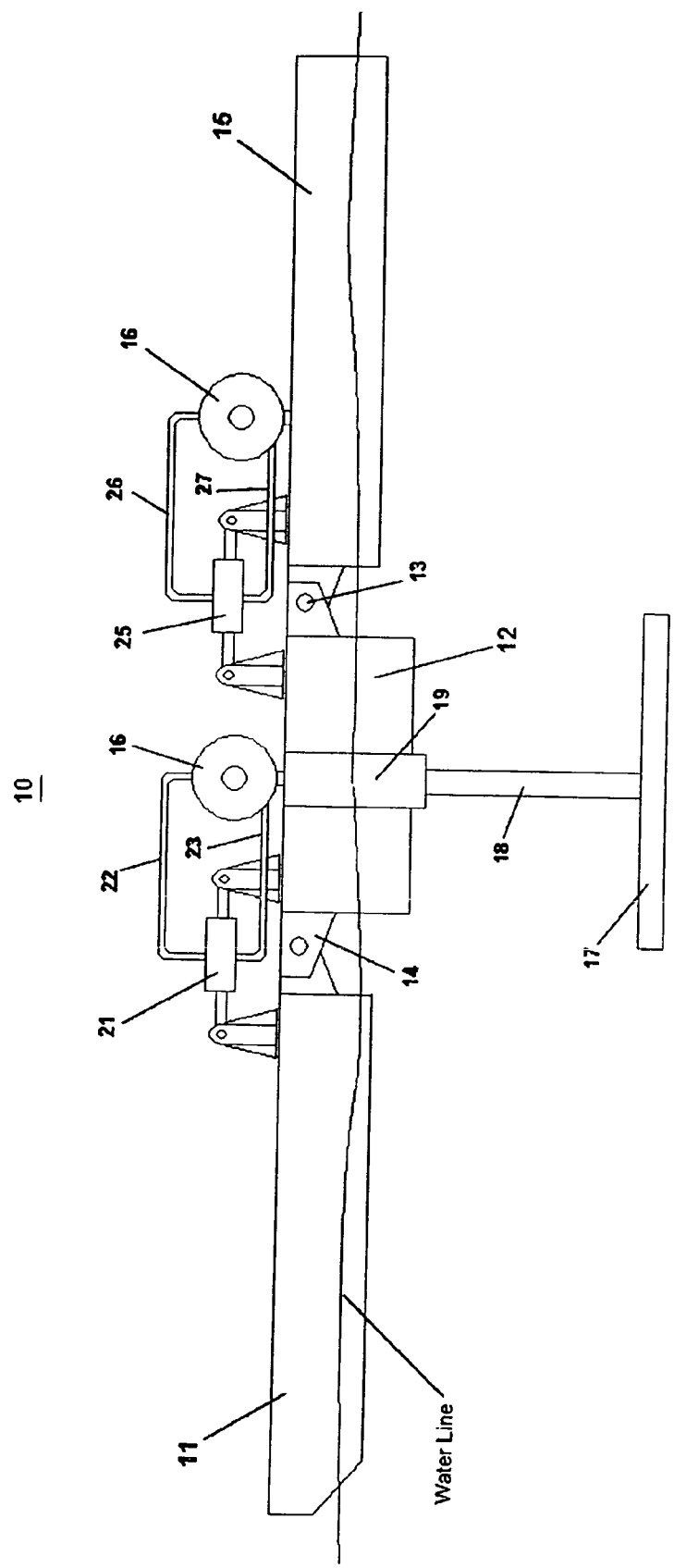
Figure 1C:
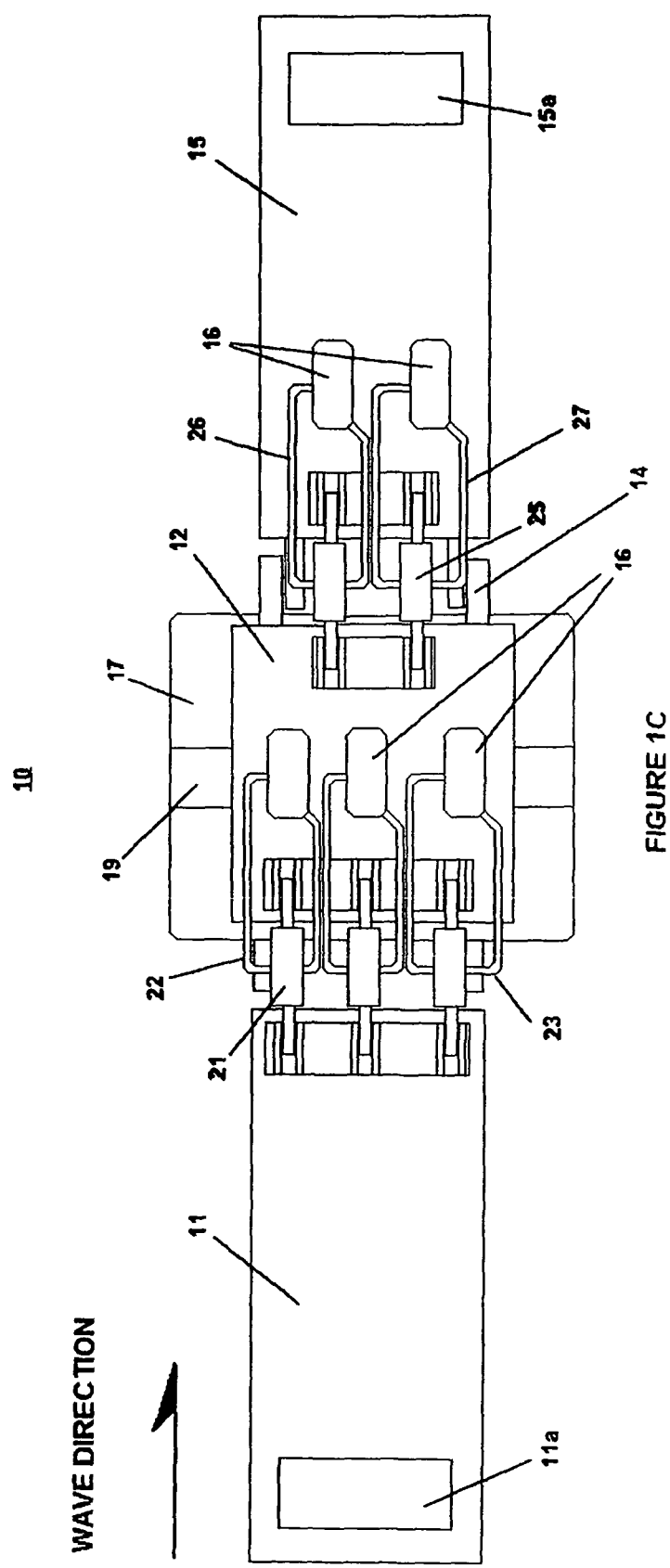

In a first preferred embodiment of the invention for a system that produces electricity through the conversion of wave energy, as shown in FIGS. 1A-1C as an example, one or a plurality of barges will pitch at the frequency of the incident waves; radiated waves will then be created which result in a destructive interference of the radial and incident waves, causing focusing on the system by diffraction. Diffraction is the movement of energy in a direction perpendicular to the direction of wave travel. For example, if a wave is blocked by an obstruction, diffraction allows wave energy to fill in the "shadow" behind that obstruction.

Absorption of wave energy by a floating body (i.e., a barge) is directly related to that floating body's ability to generate a wave that cancels the incident wave. The system of the invention is intended to generate waves radiating to the front as well as the sides. This ability allows it to capture wave energy from the sides as well.

Experiments have shown that system of the invention can absorb energy from a width that is greater than the beam of a barge because the wave energy is pulled in from the side of the barge. While there are certainly significant energy losses in converting this kinetic energy into electrical energy, the system can capture all of the energy in the width of the wave incident on the barge.

The present invention uses diffraction focusing to pull in energy from a width greater than the width of the device. This diffraction focusing is directly analogous to a concentrating solar collector; in effect, a concentrating solar collector can absorb more energy than the sunlight that is directly incident on the collector itself because of the mirrors or lenses that direct the sunlight toward the collector.

One aspect of implementing diffraction focusing in the present invention is through the dimensions of the barges that are incorporated in the present invention. In particular, it has been determined experimentally that, for purposes of diffraction focusing, the overall length of a Wave Energy Converter (WEC) such as the present invention should be determined by the wavelength of the medium (an ocean wave, in this case) so as to optimize energy capture. This can result in increased power conversion efficiency of 1.4× to 1.6×, depending on wave climate conditions. This is illustrated in the article by McCormick et al., "Large Scale Experimental Study of the McCabe Wave Pump," U.S. Naval Academy EW-03-92, January 1992.

As an example of the preferred embodiment, the structure 10 embodies three barges: a wave-engaging forward barge 11 and an after barge 15, each connected by hinges 13 and hinge supports 14 to a center barge 12, allowing for articulated motion. Attached to central barge 12 is an inertial-damping plate 17 designed to minimize the heaving motion of the central barge 12 and, thereby, minimize the vertical displacement and increasing stability of central barge 12. The concentrated weight of the plate 17 supported by side spuds 18 which movably connect to spudwells 19 that are attached to the central barge 12 will produce a pendular action, causing a pitching motion of the center barge 12 which will, in turn, enhance the relative angular motions of the barge pairs 11,15.

Figure 1D:
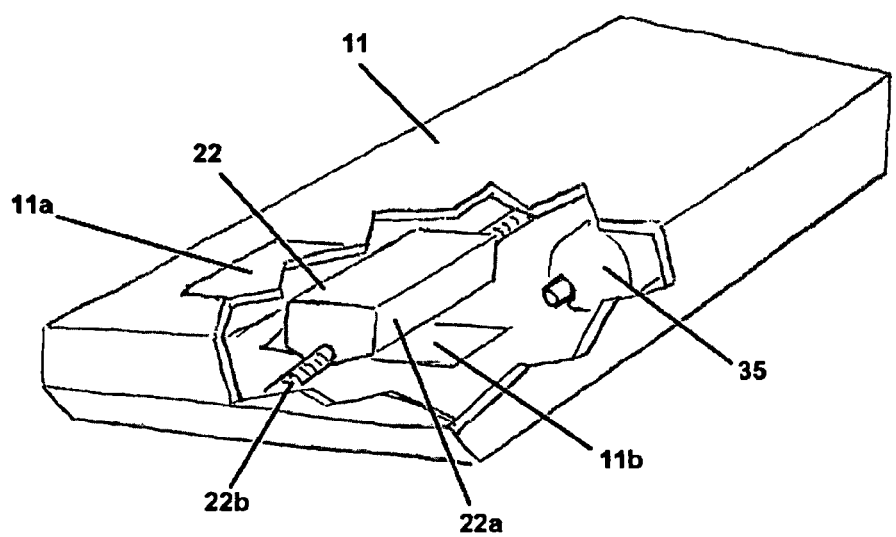

As shown in FIG. 1D, resonance of the forward and after barges is achieved by a movable ballast weight 22 that can be positioned at different locations between the bow and stern of each barge to adjust the mass moment of inertia of the system, thereby changing the natural pitching frequency. The ballast weight 22 may be implemented using, for example, a mass of high density material 22a mounted on a threaded rod 22b within the hull of a barge (in this example, the forward barge 11) to allow forward and aft adjustment, as sea conditions demand for maximum energy transfer. The movable ballast may be further enhanced by the use of resistance inherent in control pumps or linear induction generators. In this regard, one embodiment for the movable ballast enhancement as shown in FIG. 8 (overhead view) incorporates a control pump or linear induction generator 60 fixedly mounted in the barge and operatively connected to the movable ballast via a screw-shaft 62 such that the movement of the ballast weight 22 along the threaded rod 22b also causes the transfer of kinetic energy into the control pump or linear induction generator 60. In the case of a linear induction generator, in one implementation (for example, using a reciprocating linear alternator manufactured by UMBRA Group) the linear induction generator 60 is connected such that at least one of the forward or backward movement of the ballast weight 22 along the threaded rod 22b causes the linear and/or rotational movement of the screw-shaft 62 of the linear induction generator 60 to inductively generate electricity. The screw-shaft 62 of the linear induction generator 60 may be connected to the ballast weight 22 directly or through a mechanical transmission system 64 that translated the forward/backward linear motion of the ballast weight 22 into linear/rotational motion for the screw-shaft 62 sufficient to induce the generation of electricity. In addition, linear induction generator 60 may also operate as a motor to control the linear motion and/or position of the ballast weight 22 along the threaded rod 22b.

Each of the forward barge 11 and an after barge 15 is designed with an elongated, rectangular shape made of, for example, steel or composite materials, in order to maximize hydrodynamic efficiency in capturing and transferring of wave energy to the pumps 21,25, while being structurally resilient to the constant impact of incoming waves and to the corrosive effects of an ocean environment. However, other shapes and configurations may be used as would be understood by those of skill in the art, while still remaining within the scope and spirit of the invention.

Similarly, the central barge 12 is designed with a rectangular shape and made of steel or composite materials, in order to maximize hydrodynamic efficiency in capturing and transferring of wave energy from the pumps 21,25 to the electrical generators 16, while being structurally resilient to hold any and all components mounted thereon (i.e., the electrical generators, sensors, antennas, hazard lights, enclosures), and still withstand the constant impact of incoming waves and to the corrosive effects of an ocean environment.

However, other shapes and configurations may be used as would be understood by those of skill in the art, while still remaining within the scope and spirit of the invention.

As noted above, the barges 11,12,15 are constructed from steel or composite materials including but not limited to carbon fiber-reinforced polymers, ceramics, fiber laminated steel, fiber laminated aluminum, fiber laminated ceramic, fiber-reinforced resin substrates, and Kevlar-reinforced structures. The use of composite materials and structures as described hereinabove allows the barges 11,12,15 to be more durable to withstand the continuous exposure to the forces of waves, and the corrosive effects of seawater, sunlight and heat, all over a long period of time. State-of-art fabrication methods for constructing the components of the barges 11,12,15 may include the use of Vacuum Assisted Resin Transfer Molding (VARTM) Ultraviolet Vacuum Assisted Resin Transfer Molding (UV-VARTM), Ultraviolet Prepreg (UV-PPG), Low-Temperature Cure Prepreg (LTC-PPG), and RIRM (Resin Injection Recalculating Molding (RIRM) processes. The VARTM method commonly is used due to its associated high fabrication quality compared to the other fabrication methods. This process generally is associated with high strength and stiffness, consistent quality, lower volatile organic compound (VOC) emissions, and reduced laminating labor.

Environment effects need to be considered when selecting a composite material for a marine application such as that of the present invention. Particularly, degradation of the structural properties due to moisture absorption, temperature effects, and ultraviolet (UV) exposure need to be accounted for and kept to a minimum. Fortunately, resin additives have been developed recently to decrease the amount of water absorption and minimize the effects of temperature (both low and high temperature conditions) and UV exposure. In addition to additives, both gel coats and UV screens have been used to decrease UV exposure.

Composite structural elements such as the barges 11,12,15 may be joined using two different methods: bolting and bonding. Generally, bonding is the preferred joining method in marine applications due to the number of advantages bonding has compared to bolting. One advantage is that the stress distribution over a bonded area is uniform which is not true for bolted joints. Therefore, a thinner element thickness may be used due to the lack of stress. Also, the fatigue life is up to 20 times longer than the fatigue life for an identical part with bolts. Another advantage is that sandwich structures and other complex geometries can be joined by bonding which is not the case for bolts. Finally, fiber reinforced polymers (FRP) fasteners are much more expensive than adhesives. It should be noted that a combination of bolting and bonding often is recommended for FRP-steel connections.

Another advantage of using composite structures is that they can be repaired in the field or at a shipyard depending on the severity of the damage. Damage most often seen is surface damage (cracks, crazing, blisters and abrasion), laminate damage (cracks, crushing, punctures, and delamination of the laminate), and core debonding in a sandwich structure. The repair methods are based on established procedures used in commercial boat fabrication and repair. Generally they involve damage assessment (probing or hammer sounding), removal of damage, and repair using FRP reinforcement.

With respect to the operation of the structure 10, the pendular action of the barge pairs 11,15 is translated into a closed-loop hydraulic fluid flow in the power pumps 21 and the motion control pumps 25. Specifically, the pendular action of the forward barge 11 causes the power pumps 21 to force hydraulic fluid to flow through corresponding high-pressure hydraulic feed lines 22 into corresponding electrical generators 16 and through low-pressure hydraulic feed lines 23 back to the power pumps 21. Similarly, the pendular action of the after barge 15 causes the motion control pumps 25 to force hydraulic fluid to flow through their corresponding high-pressure hydraulic feed lines 26 into corresponding electrical generators 16 and through low-pressure hydraulic feed lines 27 back to the motion control pumps 25. The power pumps 21 and the motion control pumps 25 are dual-acting hydraulic pumps whose outputs are rectified by a control system and smoothed by accumulators. The power pumps 21 and the motion control pumps 25 may be implemented using conventional pumps known in the art that are appropriately selected to conform to characteristics consistent with the performance, endurance and longevity and environmental survivability requirements of the present invention.

The electrical generators 16 are configured to generate electricity from the flow of hydraulic fluid through their internal turbines. Such electrical generators may be implemented using known water turbine generator designs capable of transferring energy and thereby generating electricity using the impulse power and frequency of incoming ocean wave patterns as would be understood by those of skill in the art, including but not limited to Pelton Wheel-based devices, Kaplan turbines and linear induction motor/generators (i.e., UMBRA Group rectifying linear alternator). The control system is configured to control the flow from the pumps 21,25 to and through the turbines of the electrical generators 16 so as to be quasi-rectified-sinusoidal in time. In the case of the linear induction motor/generators (i.e., UMBRA Group rectifying linear alternator), the control system is configured to activate/deactivate the linear induction motor/generators to thereby achieve the same or similar shunting, absorbing, pushing, pulling or other kinetic action required.

In the case of using linear induction motor/generators as the electrical generators 16, one implementation as shown in FIG. 9 (for example, again using a reciprocating linear alternator manufactured by UMBRA Group) would embody each of the linear induction motor/generators 36 being connected via its screw-shaft 36a to an energy transfer shaft 38 that is connected to a forward barge 11 or an after barge 15 (in this illustration, a connection between the forward barge and the central barge is used as an example) at hinge points 40 such that at least one of the forward or backward hinged movement of the forward barge 11 or the after barge 15 causes linear and/or rotational movement of the screw-shaft 36a of the linear induction motor/generator 36 to inductively generate electricity. The linear induction motor/generator 36 may be connected to the forward barge 11 or the after barge 15 either directly or through a mechanical transmission system 42 that translated the forward or backward hinged movement of the forward barge 11 or the after barge 15 into linear and/or rotational movement of the screw-shaft 36a of the linear induction motor/generator 36 sufficient to induce the generation of electricity.

As with the barges 11,12,15, the other components of the structure 10 that are mounted with or co-located with the barges may be constructed with similar materials so as to make them durable to the effects of the environment. In addition, components such as the power pumps 21, the motion control pumps 25 and the electrical generators 16 may be positioned so as to fit in one or more enclosures mounted atop the barges 11,12,15 (see for example FIGS. 4, 5A-5B, 7 and 7A-7B).

The inertia-damping plate 17 is designed to stabilize the central barge 15, providing a reference against which the fore and aft barges 11,15 can react. It does so by using the force due to the surrounding water as the plate 17 moves. This hydrodynamic force can be broken into three components: added-mass, radiation damping, and viscous damping. The added-mass is due to the inertia of the water which is accelerated when the plate 17 accelerates. The plate 17 moves a large amount of water when it moves, and therefore the plate appears to have much more inertia than that of its own solid mass. This inertia which opposes acceleration of the plate is called added-mass.

As the plate 17 moves, it also generates waves. These waves radiate out away from the plate 17, carrying energy with them. In what may seem to be a paradox, a good wave absorber must also be a good wavemaker; to absorb incident waves, a device must effectively create a wave that cancels the incident wave, so that the wave is reduced as it passes the device. The force due to this radiation is 180 degrees out of phase with the velocity of the plate, and therefore it is described as a damping force. Another damping force arises from the viscous losses of moving the plate 17 through the water. The plate 17 generates vortices as it oscillates, which carry energy away from the plate. The force needed to generate these vortices is called the viscous damping. Unlike the radiation damping, this force is not productive, and represents simply a dissipation of energy.

Figure 2:
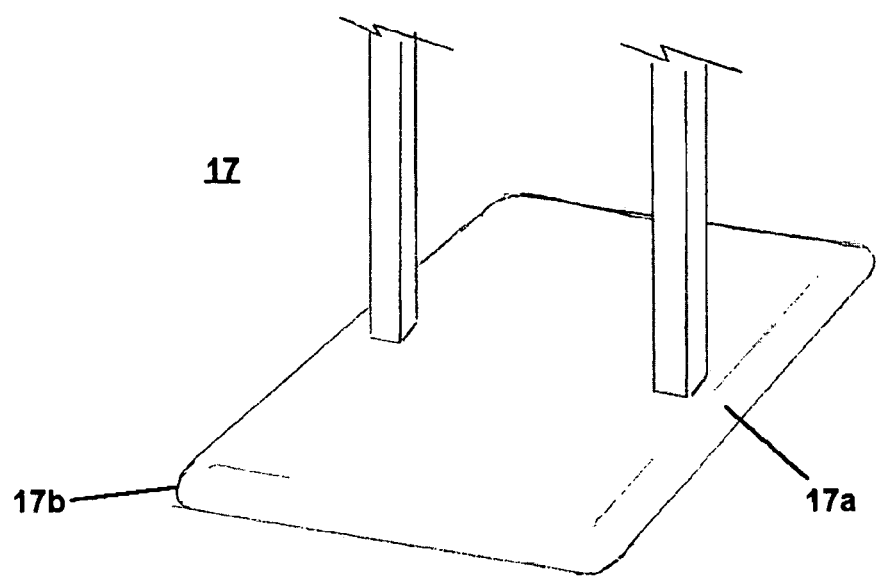
FIG. 2 illustrates an overall view of the inertial damping plate according to at least one embodiment of the present invention.

As shown in FIG. 2, the inertia-damping plate 17 is designed to maximize added-mass and radiation damping, while minimizing viscous damping. A flat plate design entrains a lot of surrounding water as it moves, and hence has a large added-mass. Likewise, this shape is a good wave-maker, so its radiation damping is large as well. By rounding the edges 17a of the plate 17 and rounding the corners 17b of the plate, the viscous damping can be reduced greatly, meeting the hydrodynamic goals for this component of the wave-energy conversion structure 10.

In the implementation of the structure 10, the inertial-damping plate 17 is located beneath the structure 10 at a depth many times greater than that of the surface of the water to provide a moment arm that produces a torque sufficient to resist movement of the structure 10 due to random wave motion.

Figure 3:
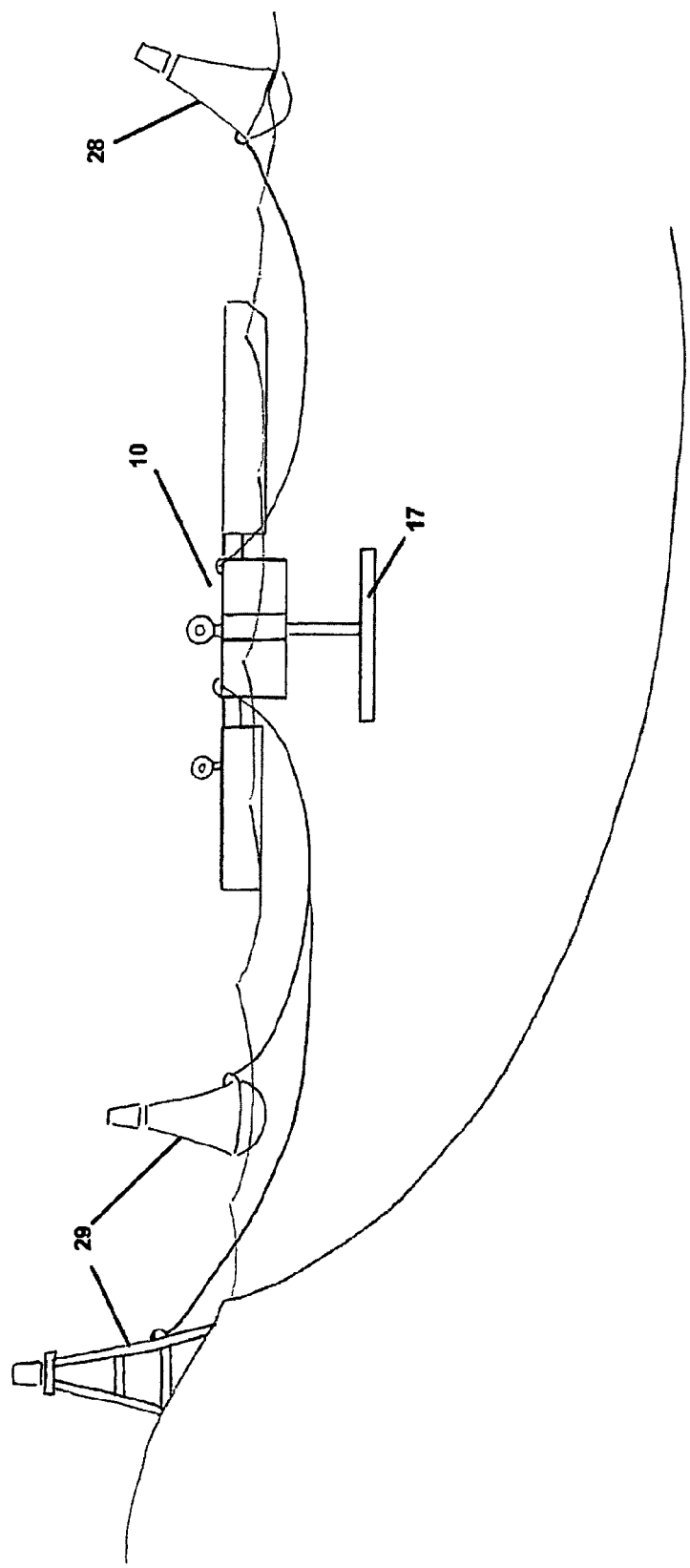
FIG. 3 illustrates an overall view of one embodiment for mooring the system of the present invention.

In one embodiment for mooring the structure 10, as shown in FIG. 3, the structure 10 is primarily, though not exclusively, intended to harness the energy of the ocean swell, that is the onshore swell coming across the ocean as a result of storms or disturbances at distant locations, and not the power of local wind-generated waves or waves caused by the tide, and in particular is not intended to harness the power of breaking or crested waves. Because the swell is towards the shore, the structure 10 may be secured by mooring lines attached to a mooring buoy 28 located seaward of the structure 10. The structure 10 may also be prevented from swinging in the wind by secondary mooring lines connected to a secondary mooring buoy or station 29 located towards the shore. Further mooring lines (not shown) may also be connected to the damping plate 17. The wavelength of the ocean swell varies from region to region, and the dimensions of the barges 11,12,15 are chosen as a function of the characteristic local wavelength to optimize output.

It should be noted that, for simplicity of illustration purposes only, the structure 10 is shown in FIGS. 4, 5A-5B, 6 and 7A-7B as having an enclosure over the electrical generators 16 and at least a portion of the structure of the pumps 21,25. It is understood that the structure of the structure 10 and/or its equivalents, as shown in at least FIGS. 1A-1D and 3, and as described herein, is fully present and implemented in all the drawings and embodiments disclosed in this application.

Alternatively, the mooring lines may be modified to allow the movement or re-positioning of the structure 10 so as to aim the structure 10 in a manner to maximize the interaction between the barge pairs 11,15 with the incoming waves or currents, thereby maximizing the transfer of wave energy into the structure 10. One example implementation would include configuring at least one of the seaward mooring buoy 28 or the secondary mooring buoy/station 29 so as to be movable. The seaward mooring buoy 28 or the secondary mooring buoy/station 29 could be provided with motors or other forms of locomotion such that a controller could re-position them relative to the direction and conditions of the incoming waves and/or currents. Alternatively, the seaward mooring buoy 28 and/or the secondary mooring buoy/station 29 could be moved manually by operations personnel in charge of maintaining the structure 10.

However, other procedures known to those of skill in the art may be substituted to implement the mooring of the structure 10 in a manner consistent with the scope and spirit of the invention. In particular, the mooring of the structure 10 would be designed so as to be structurally and operationally compatible with a device for submerging and re-floating the structure 10, as will be described hereinbelow.

To implement a control system for the present invention, such a control and communication system would have to be configured to fulfill several purposes, including it must allow remote commands to be executed. For instance, if weather is forecasted that threatens system survival, an operator can initiate a survival sequence (i.e., submergence) and a recovery sequence after danger has passed. Optionally, the system can using known computer-based technologies initiate these sequences automatically, if predetermined and programmed criteria are met.

The primary function of the control system would be to maintain optimum performance by keeping the system in resonance with incoming waves which it does by pressurizing the control pumps to the degree necessary to make the structure 10 as a whole in various states of rigidity, plus move the ballast in order to address the incoming wave at its optimum point. The control system would have to be configured to sense wave conditions three or more wave cycles ahead of impact, sense the momentum of the structure 10 and apply a mathematical algorithm to make corrections to maintain resonance. The control system must also sense and control the operation of accumulators incorporated into the operation of the pumps 21,25 as described above to maintain steady power production. Alternatively, the control system may also control the operation of the pumps 21,25 so as to differentiate their functions. For example, pressure in the hydraulic fluid could be controlled in the pumps 21 so as to maximize energy transfer into the electrical generators 16, while the pressure in the hydraulic fluid (i.e., back pressure) in the pumps 25 is controlled to act more as motion control stabilizers and less for absorbing wave energy, or even vice versa.

Secondarily, the control system must be configured to monitor power production and shut down the structure when productivity is below minimum to prevent reverse power flow. Based on the above description, it is understood that the physical components of such a control system would be understood and implementable by those of skill in the art using known technologies.

Second Preferred Embodiment

During periods of highly active surface waves, which can be destructive, the system may be configured to be submerged so as to prevent damage to any of the system components or subsystems, while still interacting with the wave motion or currents below the surface of the water. As is known in the art, ocean wave-energy conversion devices are naturally sited at locations that have high-energy waves. These devices are tuned to generate the most power in the wave frequencies that have the highest power, on average. However, extreme storms can create conditions that can damage the wave-energy conversion devices. Most recently, the Oceanlinx full-scale prototype off the east coast of Australia was ripped from its moorings and destroyed by storm waves in May 2010.

A novel strategy for severe weather survival of an ocean wave-energy conversion system according to the present invention embodies submerging the system when wave heights become excessive. Beneath the surface, the motions due to surface waves are greatly diminished. The system of the invention would be adapted to submerge during an extreme storm, and then be re-floated when the weather is clear.

Figure 4:
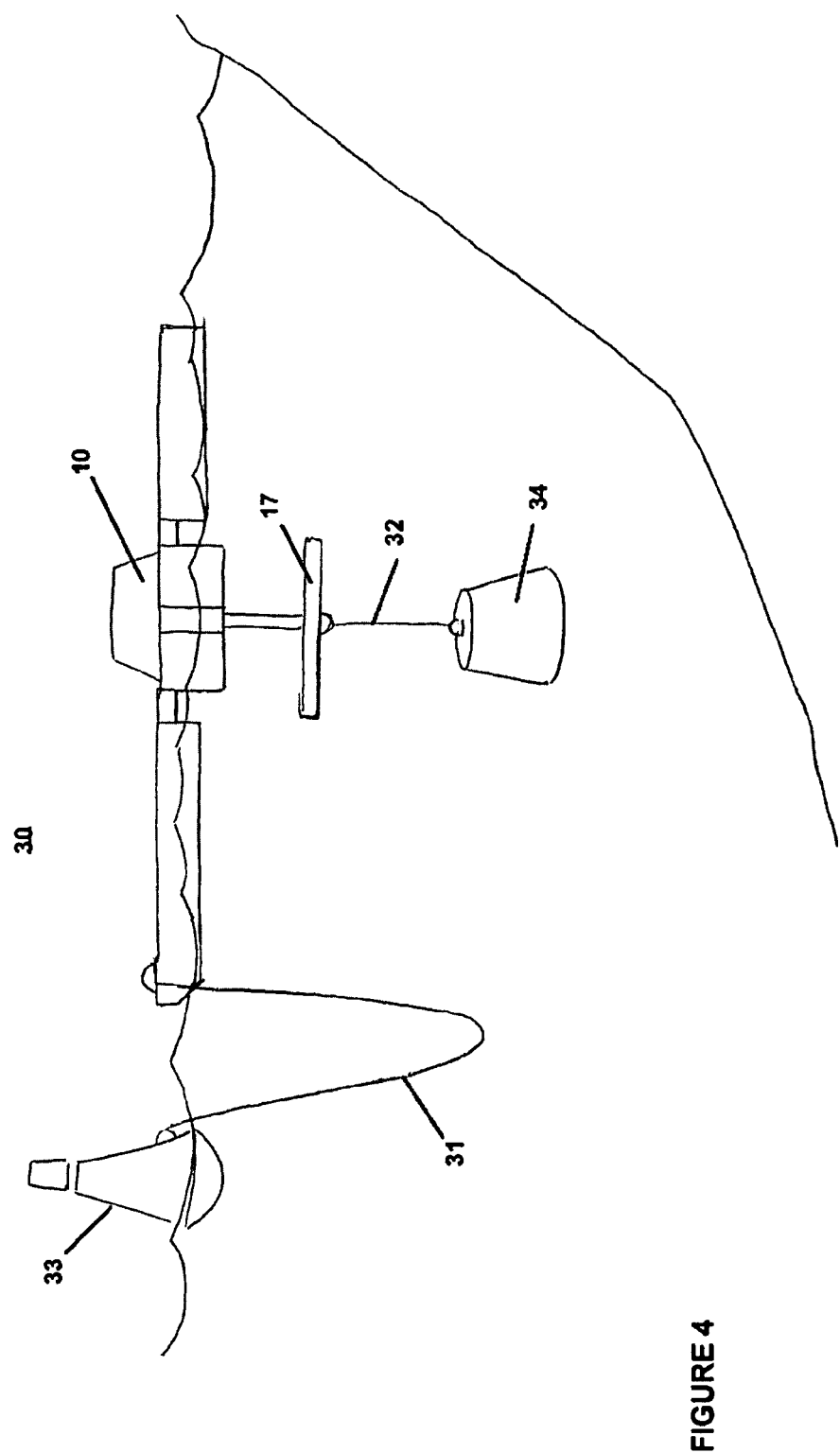
FIG. 4 shows one embodiment of a device for submerging and re-floating the system of the present invention.

In one embodiment of a system 30 for submerging and re-floating the structure 10, as shown in FIG. 4, the device 30 would be slack-moored using two primary mooring lines: one mooring line 31 is attached to the bow of the structure 10, with an intermediate float 33 on the line 31, and a second mooring line 32 attached to the bottom of the inertial/damping plate 17 at the bottom of the central barge 12, with an intermediate weight 34 on the line 32. The float 33 on the bow line 31 would keep the structure 10 oriented into the waves. The weight 34 on the central line 32 would set the depth of the structure 10 when it is submerged for an extreme weather event.

Figure 6:
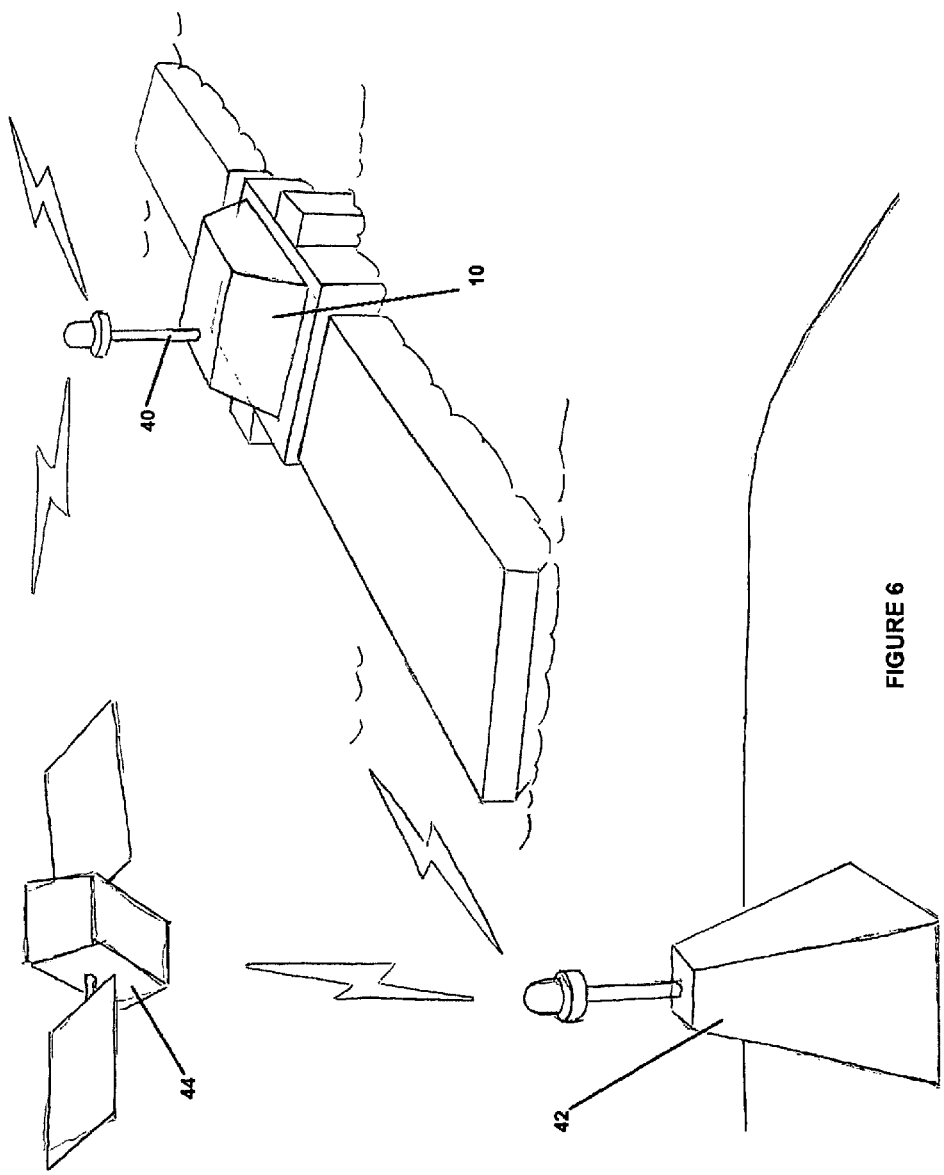
FIG. 6 shows an overall perspective view of at least embodiment of the system of the present invention illustrating a combination of elements applicable to the system depending on the specific application desired.

Referring to FIG. 6, sensors 40 mounted either on the structure 10, or sensors 42 remotely on the shore nearby, or even through sensory resources 44 designed and configured to track the movement of ocean waves (i.e., meteorological satellites) would communicate with the device 30 to activate the submergence or re-floating process.

Figure 5A:
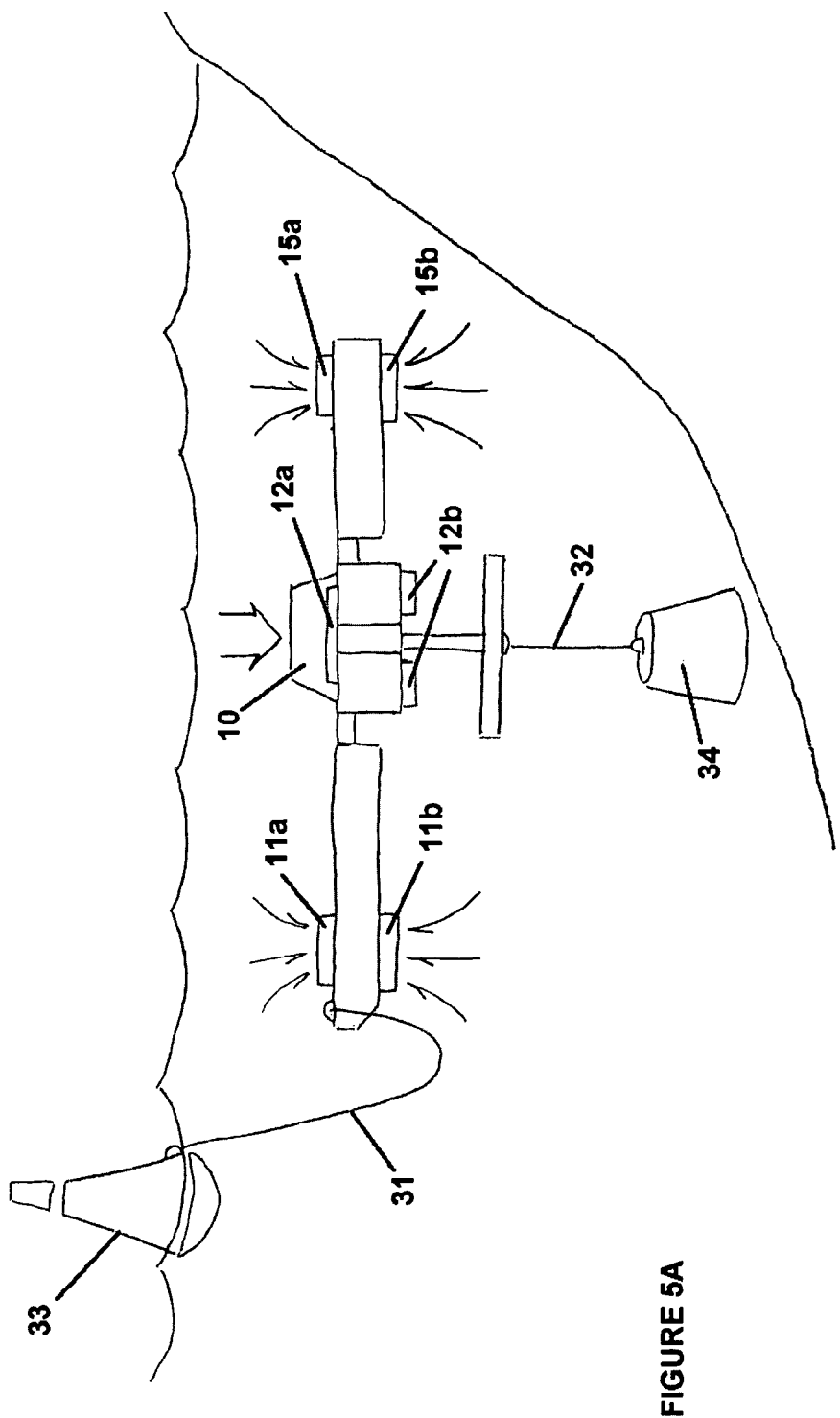
FIGS. 5A and 5B show one embodiment of the operation for submerging and re-floating the system of the present invention.

As shown in FIG. 5A, when the sensors detect waves that may put the structure 10 at risk, the submergence process begins. Gates 11a,12a,15a on the top of the barges open, and gates 11b,12b,15b on the bottom of the barges (see also FIG. 1D) open. The open cavities of the barges 11,12,15 are flooded, and the structure 10 will begin to sink. The structure 10 is pulled down under the surface by the weight 34 attached to the central mooring line 32. Then, once the weight 34 comes to rest on the bottom, the system is once again in equilibrium. With some of the weight 34 removed as it comes to rest on the bottom, the remaining buoyancy in the structure 10 is equal to the unsupported portion of the weight on the central mooring line 32, so that the structure 10 is secured below the surface. For example, in one implementation, the structure 10 is secured at 20 meters below the surface of the water. However, in other implementations, the depth of submergence may be different depending on such factors as the depth of the ocean floor beneath the structure 10, the force of the wave motion inherent in the location of the structure 10, and the strength and magnitude of the waves or currents at or near the surface whose destructive force the structure 10 is trying to avoid.

While submerged, the structure 10 may still be subjected to the motion of currents beneath the surface of the water. Thus, the barge pairs 11,15 will still be impacted by current or wave motion of varying intensities and/or frequencies, similar to those caused by surface waves. In that regard, the submerged operation of the structure 10 may be the same or similar to that on the surface. The modifications to the operation of the structure 10 would include any similar operation that would be understood by those of skill in the art.

Figure 5B:
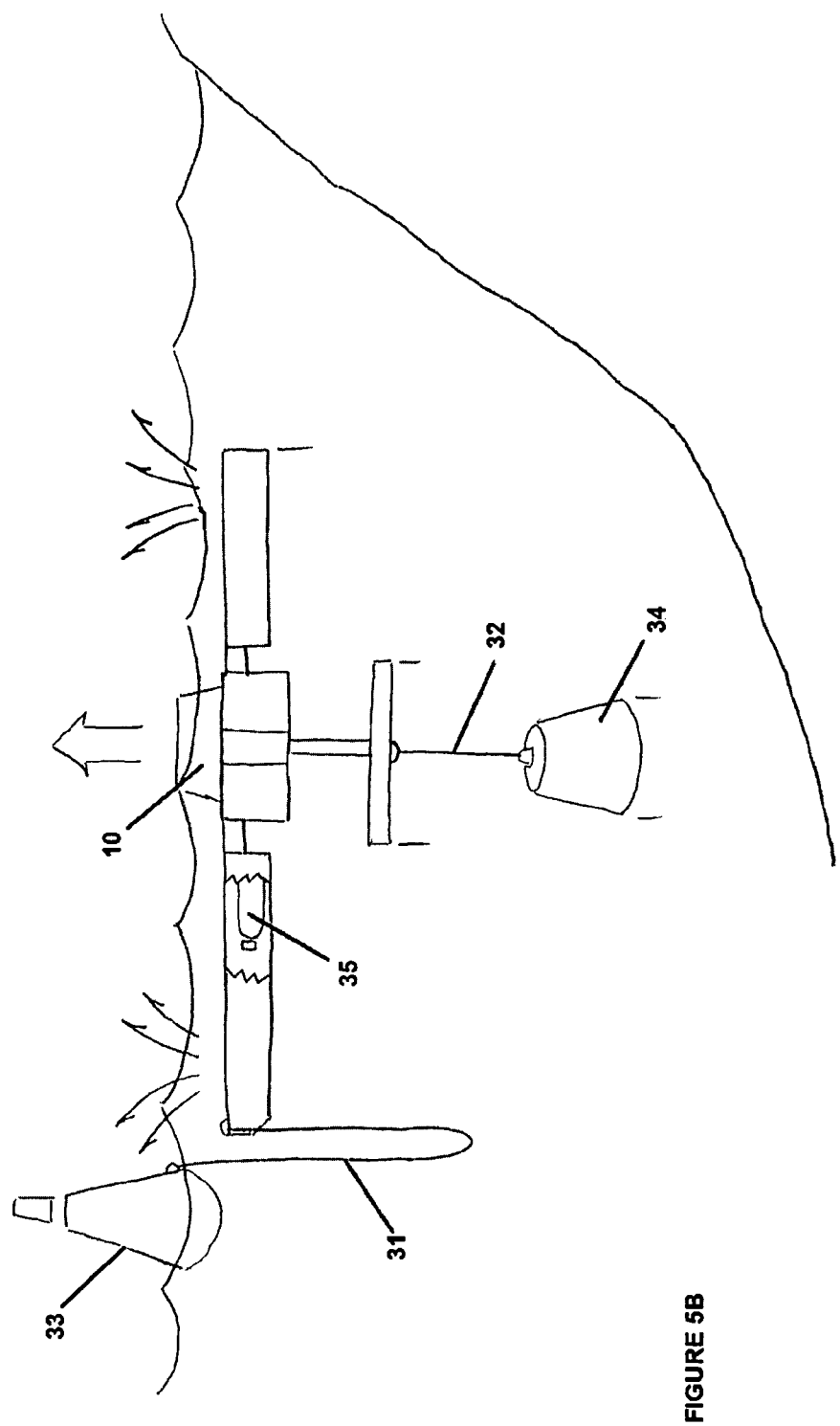

As shown in FIG. 5B, once the extreme weather has passed, the gates 11a,12a,15a on the top of the barges are closed, the gates 11b,12b,15b on the bottom of the barges are opened, and tanks 35 of compressed air or gas-generating explosive charges (see cutaway portion and also FIG. 1D) are used to force the water out from the barges, bringing the structure 10 back to its normal operating buoyancy. The gates at the bottom of the barges are then closed for normal operation. By using compressed air tanks or gas-generating explosive charges, no pumps are needed for the submergence/surfacing operation. This reduces system maintenance After an extreme weather event, the air tanks or explosives would be recharged or replaced.

By using the novel submergence/resurfacing process described above, the wave-energy conversion structure 10 will be able to avoid damage in the most extreme conditions, greatly reducing the risk for serious damage to the system. The submergence process is nearly entirely passive; once the gates on the barges are opened, then the system sinks to a fixed depth to escape the extreme weather; the control of the depth is simply based on weight and buoyancy, with no moving parts. Likewise, the floatation process depends only on closing gates and releasing air for flotation. However, other procedures known to those of skill in the art may be substituted to implement a submergence/resurfacing process consistent with the scope and spirit of the invention.

Other Embodiments

Figure 7A:
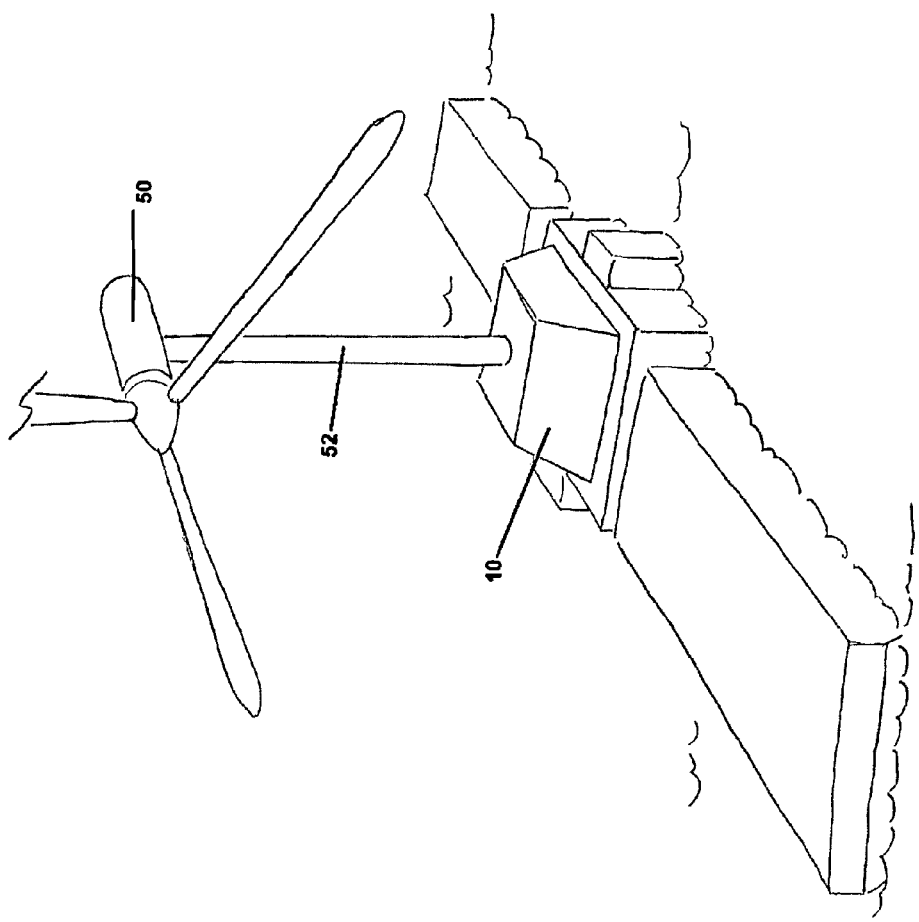

In addition to the above embodiments, other variations to the structure and operation of the structure 10 may be included to enhance and/or supplement the operation of the structure 10. For example, as shown in FIG. 7A, the structure 10 may be constructed to include wind power generators 50 atop towers 52 mounted on the central barge 12 designed to convert the wind energy inherent in areas of the world where highly active waves and wind along the shores are present. The operation of the wind power generators would otherwise be consistent with that of conventional wind power generators, but in a manner to maximize the transfer of wind energy present above the ocean, all as would be understood by those of skill in the art.

Similarly, as shown in FIG. 7B, the structure 10 may be constructed to include solar power arrays 54 mounted on the central barge 12 designed to convert the wind energy inherent in areas of the world where highly active waves and high degrees of sunlight along the shores are present. As illustrated, the solar power arrays may be positioned, shaped or contoured in such manner so as to maximize exposure to the sunlight during the course of daylight hours, while withstanding exposure to wind, seawater and other elements that are typically present in an ocean environment that may be harmful to solar power devices. The operation of the solar power arrays would otherwise be consistent with that of conventional solar power generators known in the art, but in a manner to maximize the transfer of solar energy present above the ocean, all as would be understood by those of skill in the art.

In a further embodiment, the structure 10 may be implemented using phase control methods, such as latching and declutching. In one example of a latching control system, the motions of the wave-engaging forward barge 11 and the after barge 15 are locked in position at the moment when velocity resulting from the incoming waves vanishes, and then released afterwards. This dynamic control procedure is intended to maintain the motions of the wave-engaging forward barge 11 and the after barge 15 in phase with the wave excitation force.

In one implementation of the dynamic control procedure, the power pumps 21 and the motion control pumps 25 are configured so as to be activated or shut down by the control system. For example, the control system is configured to control the flow from the pumps 21,25 to and through the turbines of the electrical generators 16 so as to be quasi-rectified-sinusoidal in time and in phase with the incoming waves. If the control system is computer-based, the control system can incorporate predetermined and programmed criteria based on the characteristics of the wave that are common at the location of the structure 10.

Alternatively, if the control system includes sensors configured to sense wave conditions three or more wave cycles ahead of impact and sense the momentum of the structure 10, the control system can apply a programmed mathematical algorithm to make dynamic corrections to maintain the resonance of the operation of the power pumps 21 and the motion control pumps 25 with the incoming wave energy. Thus, in conjunction, the control system would also sense and control the operation of accumulators incorporated into the operation of the pumps 21,25 as described above to maintain steady power production. In addition, the control system could be connected to receive input data from other sensors (not shown) positioned to monitor operation and condition of the accumulators and/or the pumps directly, thereby allowing the control system to further actively control the operation of the accumulators and pumps (i.e., real-time).

Alternatively, all the power pumps 21 and the motion control pumps 25, and their corresponding hydraulic subsystems such as accumulators and fluid transfer components, are all replaced with linear induction motor/generators and electrical subsystems. This would allow precision activation and/or shut down by the control system, and potentially minimize energy or efficiency losses resulting from the conversion of energy from mechanical/hydraulic to electrical. For example, motion control using rotating linear actuators will be embodied effectively by controlling the supplying of current to the actuators; such a structure and operation would as noted above not only avoid having to use hydraulics for barge control but also reduce the overall complexity of the system.

In one example of a declutching control system, which is a passive system, the wave-engaging forward barge 11 and the after barge 15 are allowed to move relative to the incoming waves, especially in locations where the energy level of each incoming wave varies substantially. This dynamic control procedure is also intended to maintain the motions of the wave-engaging forward barge 11 and the after barge 15 in phase with the wave excitation force, but to able to absorb the wave energy in locations where the wave energy level at any specific instant is less predictable or irregular.

Further details on the mathematics associated with phase control methods, such as latching and declutching, as discussed above, may be found in *Optimal Damping Profile for a Heaving Buoy Wave Energy Converter* by B. Teillant et al., which is hereby incorporated by reference.

In addition, other methods and mechanisms for converting the energy of the waves translated into pendular motion of the barges and into electricity may be used as would be understood by those of skill in the art. For example, the hydraulic system of using the pumps 21,25 in conjunction with electrical generators 16 may be replaced using any similar device that can convert mechanical energy into electrical energy, such as induction-based generators (i.e., linear induction motors/generators) or flywheel energy storage devices. In effect, the mechanical energy generated by the pendular action of the barges 11,15 is used to operate the induction-based generators that then outputs electrical energy. Alternatively, the mechanical energy can be similarly inputted into a flywheel energy storage device that would then generate, store and output electricity as desired. Other variations and modifications known and/or understood in the art could also be applied to the present invention as disclosed.

It should be appreciated that the various aspects and embodiments of the present invention as disclosed herein are merely illustrative of specific ways to make and use the invention and do not therefore limit the scope of the invention when taken into consideration with the appended claims and the following detailed description and the accompanying Figures. Features from one aspect and embodiment of the invention as disclosed herein can be combined with features from other aspects and embodiments of the invention.

Having thus described the present invention in detail, it is to be understood that the foregoing detailed description of the invention is not intended to limit the scope of the invention thereof. One of ordinary skill in the art would recognise other variants, modifications and alternatives in light of the foregoing discussion.

We claim:

1. A structure for converting wave energy that is positioned in seawater in the path of oncoming waves, comprising:

a wave-engaging forward barge;
an after barge;
a central barge, each of the forward and after barges being movably connected to the central barge so as to allow for articulated motion therebetween, wherein the forward barge is positioned in front of the central barge and the after barge is aligned behind the central barge such that the oncoming, waves impact in the order of the forward barge, the central barge and then the after barge;
an inertial damper plate connected to a lower portion of the central barge and operatively connected to provide displacement stability to the central barge, the inertial damper being connected via spud support to the central barge wherein the inertial damper is configured to promote a pendular motion of the central barge, wherein the central barge floats in the seawater at a minimum vertical displacement to achieve stability;
an electrical generator mounted on top of at least one of the wave-engaging forward barge, the after barge and the central barge, and the electrical generator being operatively connected between tile central barge and the forward barge and between the central barge and the after barge so as to generate electricity in response to wave motion impacting and displacing the wave-engaging forward barge and the after barge relative to the central barge while the central barge is at the minimum vertical displacement, wherein the electrical generator is configured to convert mechanical motion of the forward barge, and the after barge relative to the central barge in response to the wave motion so as to generate electricity at the electrical generator on top of the at least one of the wave engaging forward barge, the after barge and the central barge, and the electrical generator is further configured to transmit the electricity to nearby land; and a mechanism for controllably submerging at least the wave-engaging forward barge, the after barge and the central barge entirely to a stationary position at a predetermined depth below a seawater surface in response to current wave conditions of the surrounding environment, and for re-floating the wave-engaging forward barge, the after barge and the central barge back to the seawater surface, wherein the mechanism is configured such that, while entirely submerged, the central barge, the forward barge and the after barge are movably aligned so as to allow for articulated motion therebetween such that oncoming underwater waves impact the forward barge, the central barge and the after barge so as to continue generating electricity via the electrical generator.

2. A structure according to claim 1, wherein each of the wave-engaging forward barge and the after barge includes a movable ballast weight controllably positionable between bow and stern positions within the forward barge and the after barge so as to controllably adjust a mass moment of inertia of a corresponding barge, thereby changing natural pitching frequency of the corresponding barge.

3. A structure according to claim 1, wherein the electrical generator further includes a plurality of electrical generators mounted on top of at least one of the wave-engaging forward barge, the after barge and the central barge, the plurality of electrical generators being operatively connected between the wave-engaging forward barge and the central barge and between the after barge and the central barge, wherein the plurality of electrical generators are configured to generate the electricity in response to the mechanical motion of the wave-engaging forward barge and the after barge relative to the central barge and to transmit the electricity generated at the plurality of electrical generators to the nearby land.

4. A structure according to claim 1, wherein the mechanism for controllably submerging and re-floating the structure includes a weight attached to a bottom portion of the central barge, and each of the wave-engaging forward barge, the after barge and the central barge having controllably openable grids to allow seawater to flood open cavities of each of the barges when submerging the structure, and refloating elements in each of the wave engaging forward barge, the after barge and the central barge configured to force out the seawater in the open cavities of the barges when re-floating the structure.

5. A structure according to claim 1, wherein each of the wave-engaging forward barge, the after barge and the central barge is constructed from at least one of steel, composite materials and a combination of both.

6. A structure according to claim 1, wherein the electrical generator includes at least one linear induction motor/generator.

7. A structure according to claim 1, further comprising:
sensors configured to detect and measure the current wave conditions of the surrounding environment; and
a control system configured to control the mechanism for controllably submerging and re-floating the structure, so as to controllably submerge the structure when current wave conditions are determined to be damaging to the structure and to re-float the structure when current wave conditions are determined to be safe for normal surface operation.

8. A structure according to claim 1, further comprising:
a protective enclosure mounted on top of at least the central barge for protecting components mounted on top of the structure.

9. A structure according to claim 1, further comprising:
a wind power generator mounted on top of at least the central barge for capturing wind energy over the structure.

10. A structure according to claim 1, further comprising:
a solar power panel mounted on top of at least the central barge for collecting solar energy over the structure.

11. A structure according to claim 3, wherein the electrical generator further includes a plurality of pumps operatively connected to corresponding ones of the plurality of electrical generators, wherein each of the plurality of pumps is configured to pump hydraulic fluid to and from the corresponding ones of the plurality of electrical generators in response to the mechanical motion of the wave-engaging forward barge and the after barge relative to the central barge, and the electrical generator is configured to convert flow of the hydraulic fluid to and from the pumps into turbine motion in each of the plurality of electrical generators to generating the electricity thereby.

12. A structure according to claim 3, wherein the plurality of pumps include dual-acting hydraulic pumps.

13. A structure according to claim 11, wherein each of the plurality of electrical generators includes a linear induction motor/generator.

14. A structure according to claim 11, further comprising:
a control system configured to control the flow from the plurality of pumps to and through turbines of the electrical generators so as to be quasi-rectified-sinusoidal in time.

15. A structure according to claim 11, wherein the plurality of electrical generators include at least one of a Pelton Wheel-based generator and a Kaplan turbine-based generator.

16. A structure according to claim 5, wherein the composite materials include at least one of carbon fiber-reinforced polymers, ceramics, fiber laminated steel, fiber laminated aluminum, fiber laminated ceramic, fiber-reinforced resin substrates, and Kevlar reinforced structures.

17. A structure according to claim 6, further comprising:
a control system configured to control the at least one linear induction motor/generator.

18. A structure according to claim 6, further comprising:
sensors configured to detect and measure current conditions of at least the electrical generator; and
a control system configured to control operation of the at least one linear induction motor/generator.

19. A system for collecting and converting wave energy, comprising:
a plurality of floating structures, positioned in seawater in the path of oncoming waves, wherein each of the structures including:
a wave-engaging forward barge;
an after barge;

a central barge, each of the forward and after barges being movably connected to the central barge so as to allow for articulated motion therebetween, wherein the forward barge is positioned in front of the central barge and the after barge is aligned behind the central barge such that the oncoming waves impact in the order of the forward barge, the central barge and then the after barge;

an inertial damper plate connected to a lower portion of the central barge and operatively connected to provide displacement stability to the central barge, the inertial damper being connected via spud supports to the central barge wherein the inertial damper causes is configured to promote a pendular motion of the central barge, wherein the central barge floats in the seawater at a minimum vertical displacement to achieve stability; and an electrical generator mounted on top of at least one of the wave-engaging forward barge, the after barge and the central barge, and the electrical generator being operatively connected between the central barge and the forward barge and between the central barge and the after barge so as to generate electricity in response to wave motion impacting and displacing the wave-engaging forward barge and the after barge relative to the central barge while the central barge is at the minimum vertical displacement, wherein the electrical generator is configured to convert mechanical motion of the forward barge and the after barge relative to the central barge in response to the wave motion so as to generate electricity at the electrical generator on top of the at least one of the wave-engaging forward barge, the after barge and the central barge, and the electrical generator is further configured to transmit the electricity to nearby land, the electrical generator further includes a plurality of electrical generators mounted on top of at least one of the wave-engaging forward barge, the after barge and the central barge, the plurality of electrical generators being operatively connected between the wave-engaging forward barge and the central barge and between the after barge and the central barge, wherein the plurality of electrical generators are configured to generate the electricity in response to mechanical motion of the wave-engaging forward barge and the after barge relative to the central barge and to transmit the electricity generated at the plurality of electrical generators to the nearby land, and a plurality of pumps operatively connected to corresponding ones of the plurality of electrical generators, wherein each of the plurality of pumps is configured to pump hydraulic fluid to and from the corresponding ones of the plurality of electrical generators in response to the of mechanical motion of the wave-engaging forward barge and the after barge relative to the central barge, and the electrical generator is configured to convert flow of the hydraulic fluid to and from the pumps into turbine motion in each of the plurality of electrical generators to generate the electricity thereby; and a mechanism for controllably submerging at least the wave-engaging forward barge, the after barge and the central barge entirely to a stationary position at a predetermined depth below a seawater surface in response to current wave conditions of the surrounding environment, and for re-floating the wave-engaging forward barge, the after barge and the central barge back to the seawater surface, wherein the mechanism is configured such that, while entirely submerged, the central barge, the forward, barge and the after barge are movably aligned so as to allow for articulated motion therebetween such that oncoming underwater waves impact the forward barge, the central barge and the after barge so as to continue generating electricity via the electrical generator.

\* \* \* \* \*